United States Patent
Kang

[19]

[11] Patent Number: 6,028,850
[45] Date of Patent: Feb. 22, 2000

[54] WIRELESS TRANSCEIVER AND FREQUENCY PLAN

[75] Inventor: Inchul Kang, Los Gatos, Calif.

[73] Assignee: Hyundai Electronics America, Inc., San Jose, Calif.

[21] Appl. No.: 09/113,603

[22] Filed: Jul. 10, 1998

[51] Int. Cl.[7] .................................................. H04B 7/216
[52] U.S. Cl. ........................ 370/320; 370/335; 370/342; 370/492; 370/441; 455/76; 455/563; 375/220
[58] Field of Search .................................. 370/328, 329, 370/335, 342, 480, 481, 484, 492; 375/200, 220; 455/75, 76, 550, 563

[56] References Cited

U.S. PATENT DOCUMENTS

| | | | |
|---|---|---|---|
| 4,901,307 | 2/1990 | Gilhousen et al. | 370/320 |
| 5,539,730 | 7/1996 | Dent | 370/280 |
| 5,566,168 | 10/1996 | Dent | 370/323 |
| 5,596,600 | 1/1997 | Dimos et al. | 375/206 |
| 5,812,522 | 9/1998 | Lee et al. | 370/206 |
| 5,898,728 | 5/1999 | Sentz et al. | 375/202 |

*Primary Examiner*—Ajit Patel
*Assistant Examiner*—Bob A. Phunkulh
*Attorney, Agent, or Firm*—Townsend & Townsend & Crew LLP

[57] ABSTRACT

The present invention provides for an improved transceiver architecture using fewer frequency synthesizers. The number of frequency synthesizers is reduced by utilizing an existing frequency source having a frequency slightly offset from the ideal sampling frequency. In one embodiment, an improved transceiver capable of communicating CDMA encoded signals is presented. The transceiver includes a first frequency synthesizer producing a first mixing tone, a second frequency synthesizer producing a second mixing tone, a first sampling source producing a first sampling signal, and a receiving channel. The receiving channel includes a first mixer, a second mixer, and an analog to digital converter (ADC). The first mixer receives the incoming CDMA signal and the first mixing tone, producing a first IF signal. The second mixer receives the first IF signal and the second mixing tone, producing a second IF signal in response. The ADC receives the second IF signal and the first sampling signal, producing a digital data stream in response, whereby the frequency of the first sampling signal is offset from the frequency of the second IF signal, the digital data having a small amount of error associated therewith in proportion to the small amount of the frequency offset.

18 Claims, 4 Drawing Sheets

WIRELESS TRANSCEIVER AND FREQUENCY PLAN

CROSS REFERENCE TO RELATED APPLICATIONS

The following commonly-owned patent applications are being filed concurrently and is incorporated herein by reference in its entirety for all purposes:

"AN IMPROVED CDMA RECEIVER AND METHOD OF OPERATION," U.S. application Ser. No. 09/113,791 filed Jul. 10, 1998 pending, and "A VARIABLE CLOCK RATE CORRELATION CIRCUIT FOR A CDMA RECEIVER AND METHOD OF OPERATION," U.S. provisional application Ser. No. 60/092,374 filed Jul. 10, 1998.

BACKGROUND OF THE INVENTION

The present invention relates to wireless transceivers, and in particular to a wireless transceiver for use with existing cellular and PCS telephonic systems for communicating both AMPS and CDMA data.

Figure 1:
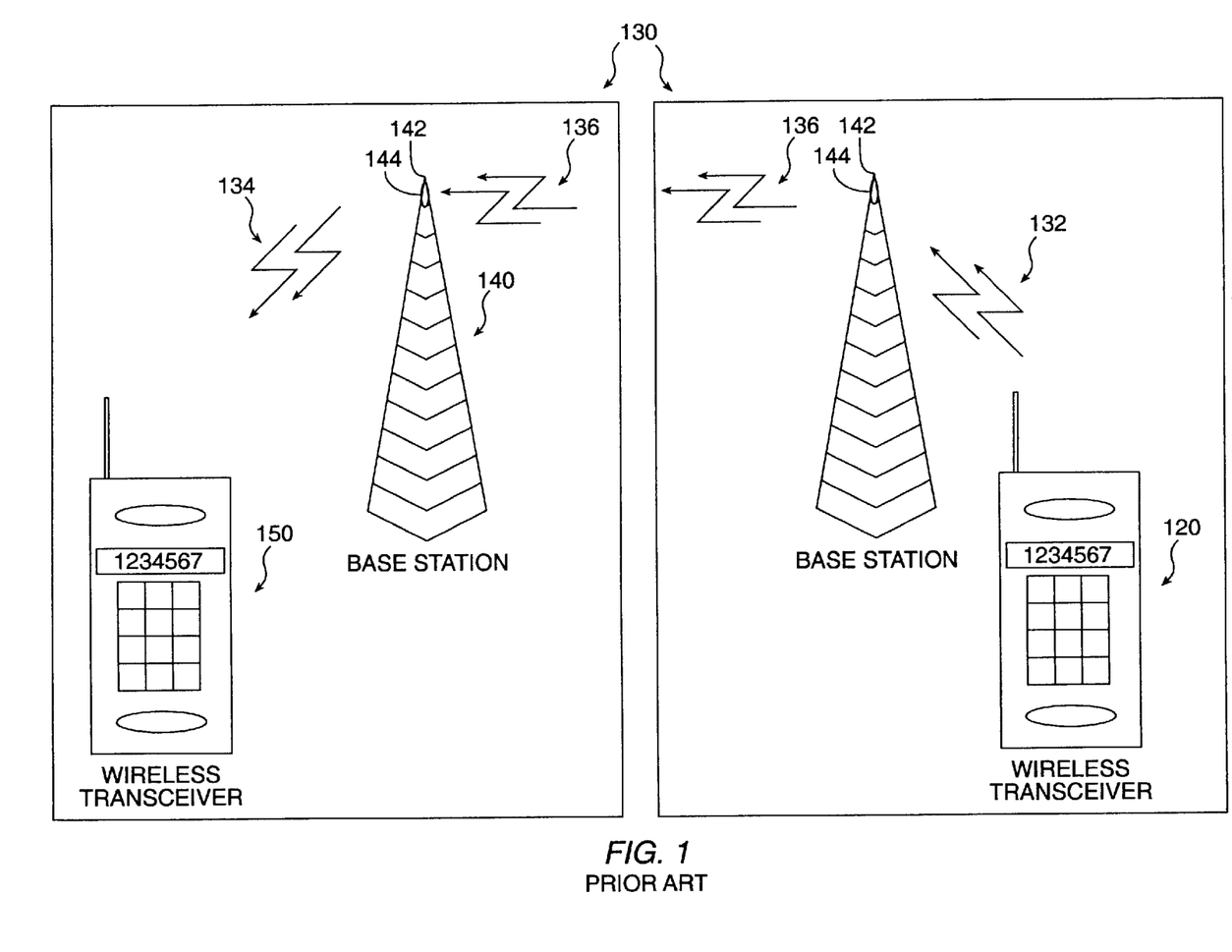
FIG. 1 illustrates a wireless communication system as known in the art.

In present day wireless telecommunications systems as shown in FIG. 1, a first wireless transceiver 120, such as a cellular telephone, communicates with a second wireless transceiver 150 via one or more "cells" 130. Each cell is employed to cover a geographical area, although some overlap may occur. Inter-cell communication is possible using handoff signals 136 communicated between cell sites.

Within each cell site 130, a base station 140 includes a receiver 142 and a transmitter 144. The receiver 142 receive signals either from users within the cell area or from an adjacent cell. The base station ascertains the destination of the received signals 132 and re-transmits them 134 via the transmitter 144 either within the cell area if the intended recipient is within the cell area or to another cell site closer to the intended recipient.

Each wireless transceiver 120 and 150 includes a transmitter 124 for transmitting signals 132 to the base station 140 and a receiver 124 for receiving the signals 134 transmitted from the base station 140. At present, two frequency bands are used for the received and transmitted signals. Base stations in the Cellular (cell) systems receive signals 132 in the frequency range of 824.04 MHz–848.97 MHz and transmit signals 134 in the frequency range of 869.04 MHz–893.97 MHz. PCS-band base stations receive signals 132 in the frequency range of 1851.25 MHz–1908.75 MHZ and transmit signals 134 in the frequency range of 1931.25 MHz–1988.75 MHz.

In addition to the two frequency bands available, two data modulation/demodulation techniques are also used to encrypt the data for transmission and to decipher the data when received by the intended user. The Advanced Mobile Phone System (AMPS), employs the techniques of Frequency Division Multiple Access (FDMA) to partition and reuse the available RF spectral bandwidth so as to increase the number of available users. In the AMPS implementation, a carrier consisting of a fraction of the total available bandwidth, typically 30 KHz, carries each channel's communications.

Direct Sequence (DS) Code Division Multiple Access (CDMA) is the newest data communication mode used in wireless telecommunications. In DS-CDMA systems, a unique coded address is assigned to each user. Data is transmitted to an intended recipient by superimposing the data onto an address waveform corresponding to the uniquely coded address of the intended recipient. The data has a relatively narrow bandwidth (typically 30 KHz) compared to the bandwidth of the address waveform (typically 1.23 MHz), resulting in the data being spread over the spectrum of the address waveform. The combined data+address waveform is then modulated onto a particular carrier frequency and transmitted. Although all users have access to the entire frequency band, only the intended recipient is able to decipher the transmission since he alone has the unique coded address needed to decode the data from the transmitted signal.

The transceivers 120 and 150 utilize a number of frequency synthesizers to generate the transmitting signals 132 and to downconvert the received signals 134 to extract the sent information. However, frequency synthesizers are expensive and dissipate large amounts of power, which reduces the transceiver's battery life. What is needed is a transceiver architecture and frequency plan which employs a minimum number of frequency synthesizers. Additionally, an improved transceiver architecture is needed which uses a minimum number of frequency synthesizers and which can handle both AMPS and CDMA-encoded signals.

SUMMARY OF THE INVENTION

The present invention provides for an improved transceiver architecture using fewer frequency synthesizers previously necessary. The number of frequency synthesizers is reduced by a careful selection of the transceiver's frequency plan. In addition, when the input signal is a CDMA signal, the CDMA signal is converted into digital data using a sampling frequency slightly offset from the ideal frequency. The offset sampling frequency produces some error in the CDMA data, however the offset is minor and the produced error is negligible. In this manner, the number of frequency synthesizers is reduced while overall transceiver performance is maintained.

In one embodiment, an improved transceiver capable of communicating CDMA encoded signals is presented. The transceiver includes a first frequency synthesizer producing a first mixing tone, a second frequency synthesizer producing a second mixing tone, a first sampling source producing a first sampling signal, and a receiving channel. The receiving channel includes a first mixer, a second mixer and an analog to digital converter (ADC). The first mixer receives the incoming CDMA signal and the first mixing tone, producing a first IF signal. The second mixer receives the first IF signal and the second mixing tone, producing a second IF signal in response. The ADC receives the second IF signal and the first sampling signal, producing a digital data stream in response, whereby the frequency of the first sampling signal is offset from the frequency of the second IF signal and the digital data has a amount of error associated therewith as a result of the frequency offset.

In another embodiment, an improved dual-mode wireless transceiver capable of communicating both AMPS and CDMA encoded data is presented. The dual mode transceiver includes the structure of the aforementioned embodiment, and additionally a second frequency source for providing a second sampling signal, and a switch for connecting either the first or the second sampling sources to the ADC. When the incoming signal is a CDMA-encoded signal, the first sampling signal is connected to the ADC which produces a digital data stream. The first sampling signal is offset from the frequency of the second IF signal resulting in the digital data having an amount of error associated with the frequency offset. When the incoming signal is an AMPS-encoded signal, the second sampling source is connected to the ADC and the frequency of the second sampling source is a harmonic of the second IF frequency.

A further understanding of the nature and advantage of the invention herein may be realized by reference to the remaining portions of the specification and attached drawings.

DESCRIPTION OF THE PREFERRED EMBODIMENT

Figure 2:
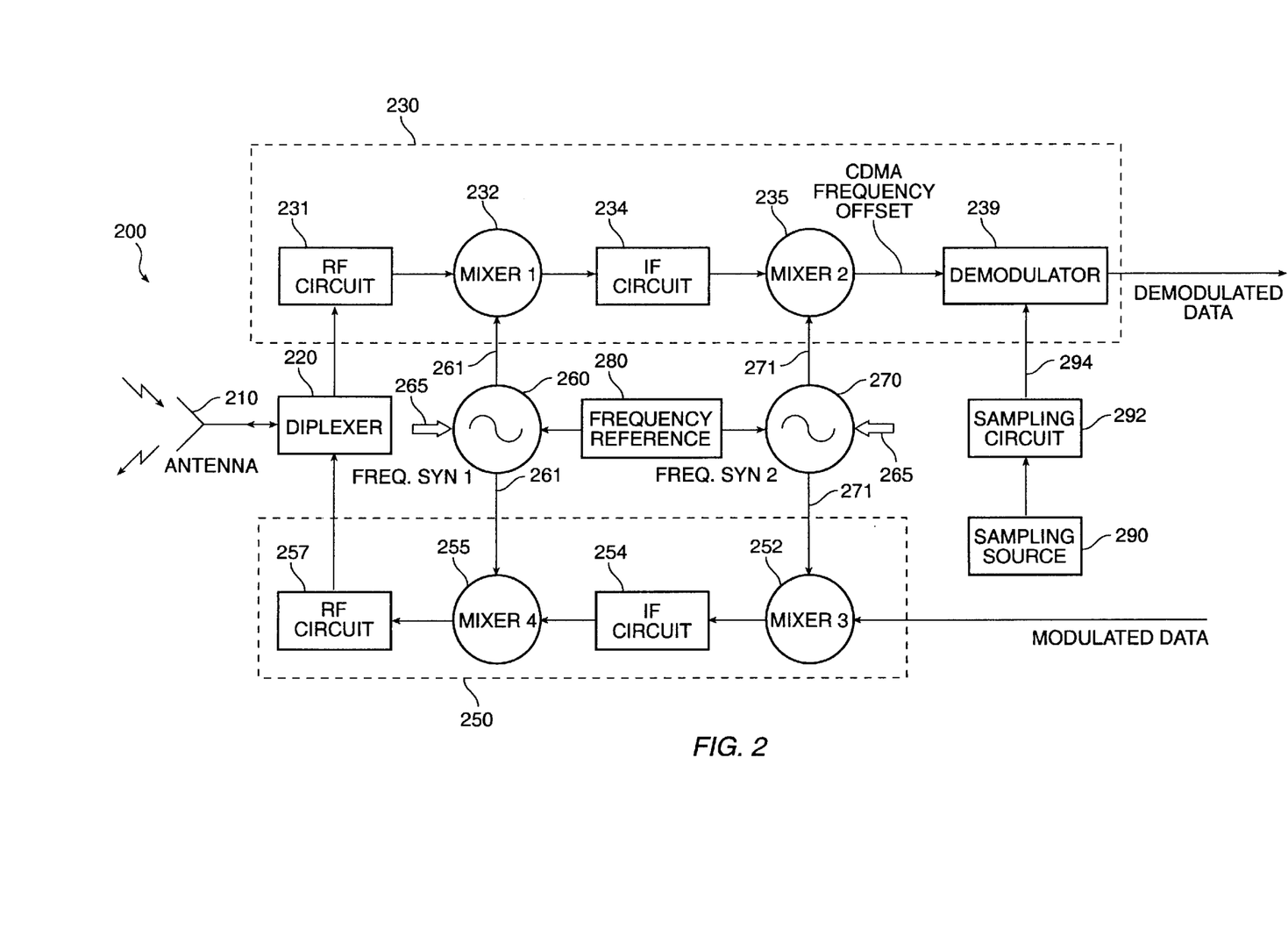
FIG. 2 illustrates an improved wireless transceiver architecture in accordance with the invention.

FIG. 2 depicts the improved transceiver architecture of the present invention. The transceiver 200 operates to receive and transmit signals 201 and 202 within the PCS and cell frequency bands, given above. The improved transceiver architecture includes a transceiver antenna 210, a diplexer 220, a receiving channel 230, and a transmitting channel 250. The transceiving antenna 210 is of a construction, material, and shape optimized for transmission and reception of signals within the desired band of operation, which in the preferred embodiment is either the cell-band frequency range or the PCS-band frequency range, described above. The diplexer 220 is used to control the direction of signal traffic coming into and emanating from the transceiver 200, depending upon if the transceiver operates in a reception mode or transmission mode, respectively.

The improved transceiver 200 employs two frequency synthesizers 260 and 270 to generate mixing tones necessary for the up and downconversion operation. Each frequency synthesizer is controllable via a user interface command line 265 to tune to a particular frequency on command and may include frequency multipliers, frequency dividers, and voltage controlled oscillators (VCOs) to generate the needed mixing tones 261 and 271.

A reference generator 280 is used to provide a stable reference frequency to each of the frequency synthesizers 260 and 270. In the preferred embodiment, the reference generator 280 is provided via a voltage controlled, temperature compensated crystal oscillator (VCTCXO) which operates at frequency of 19.2 MHz.

A sampling source 290 supplies a reference frequency to a sampling circuit 292. The sampling circuit 292 may include frequency multipliers, frequency dividers, or VCOs to translate the supplied reference frequency to sampling signal 294. The sampling signal 294 is used to convert the downconverted analog signal 236 to a digital data stream, as will be described below.

The receiving channel 230 operates as a superheterodyne, double downconversion receiver and includes an RF circuit 231, a first mixer 232, an IF circuit 234, a second mixer 235, and a demodulator 239. The transmitting channel 250 operates as a double upconversion transmitter and includes a third mixer 252, an IF circuit 254, a fourth mixer 255, and a RF circuit 257.

I. Single-Mode PCS-band Transceiver

Figure 3:
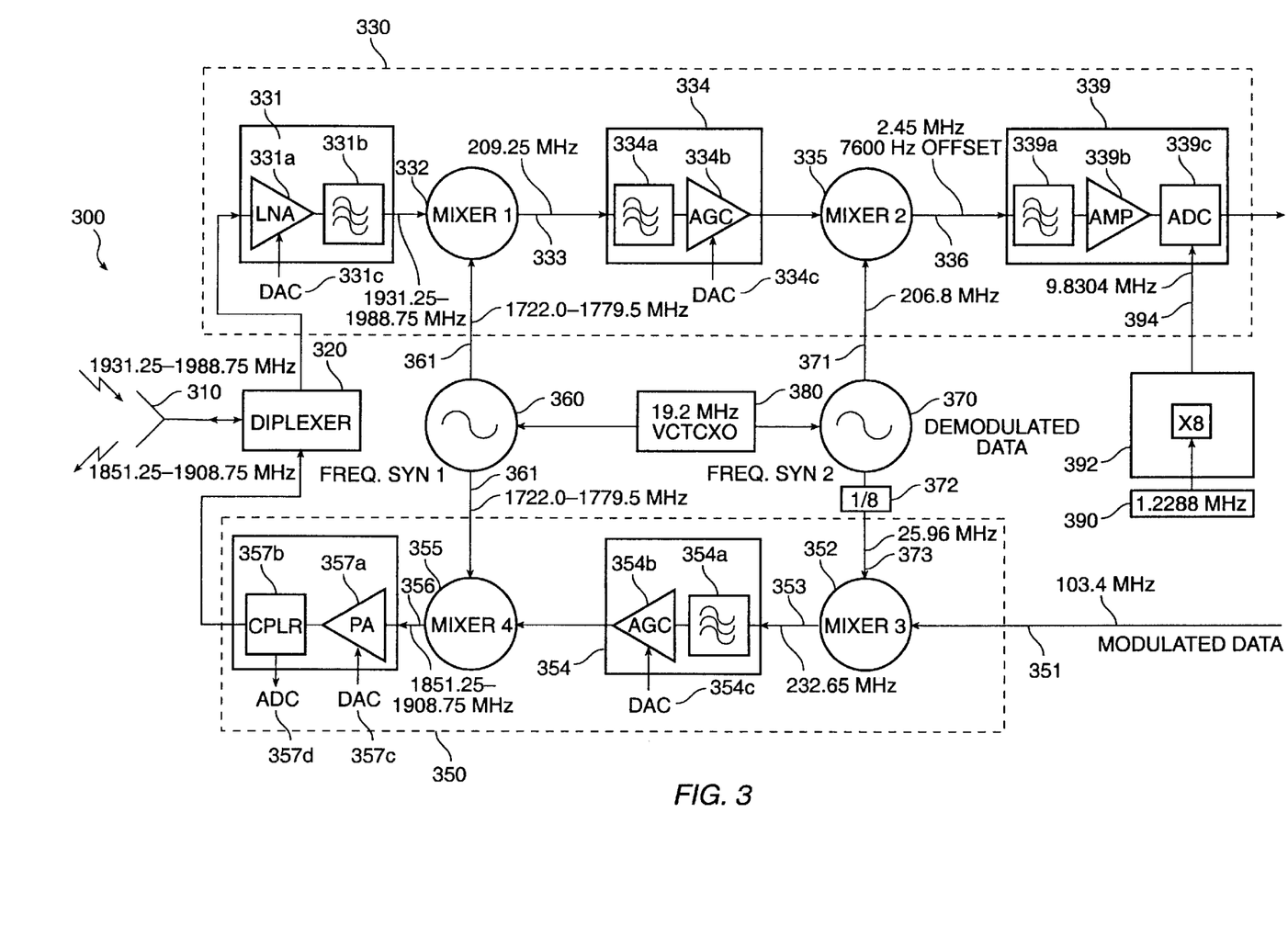
FIG. 3 illustrates a PCS-band CDMA wireless transceiver in accordance with the invention.

FIG. 3 shows a PCS-band transceiver in accordance with the present invention. The transceiver 300 includes a transceiver antenna 310, a diplexer 320, a receiving channel 330, a transmitting channel 350, a first frequency synthesizer 360, a second frequency synthesizer 370, a reference generator 380, a sampling source 390, and a sampling circuit 392, as described above.

The transceiving antenna 310 is optimized for transmission and reception of signals within the PCS frequency band, 1931.25 MHz–1988.75 MHz for receiving signals 201, and 1851.25 MHz–1908.75 MHZ for transmission signals 202. The diplexer 320 is similarly designed to operate at the transmit and receive frequencies.

The PCS-band Receiving Channel

The receiving channel 330 of the PCS-band transceiver is designed to receive and downconvert CDMA signals and includes a RF circuit 331, a first mixer 332, an IF circuit 334, a second mixer 335, and a demodulator 339. In the exemplary embodiment of FIG. 3, the RF circuit includes a low noise amplifier (LNA) 331a used to set the input noise figure and a filter 331b used to attenuate any adjacent signals near the carrier frequency. The gain and noise figure (NF) of the LNA 331a is preferably controlled by varying the power supplied thereto using a digital to analog converter (DAC) 331c. The filter 331b is preferably a 30 MHz wide bandpass SAW filter centered at 1960 MHz, but alternatively may be a high or lowpass filter and realized in lumped element or distributed form external to or as a part of an integrated circuit.

The first mixer 332 receives the conditioned RF signal and a first mixing tone 361 from the first frequency synthesizer 360, and downconverts the conditioned RF signal to a first IF signal 333. In the exemplary embodiment of FIG. 3, the first frequency synthesizer 360 is tunable and can generate a mixing tone 361 every 1.23 MHz between 1722.0 MHz–1779.5 MHz. The frequency of the first mixing tone 361 is controllably selected so that the first mixer 332 produces a first IF signal 333 at the (RF-LO) frequency of 209.25 MHz. The first mixer 332 is preferably a Gilbert Cell mixer, although alternative circuit topologies may be implemented.

The IF circuit 334 receives the first IF signal 333 and may include filtering and/or amplification circuitry. In the exemplary embodiment of FIG. 3, the IF circuit 334 includes an IF filter 334a and an automatic gain control (AGC) amplifier 334b both of which have a center frequency of operation at 209.25 MHz. The IF filter 334a is used to reduce the input channel noise floor and to attenuate spurious mixing products generated by the operation of the first mixer 333. In the preferred embodiment, the AGC amplifier 334b adjusts the receiving channel's gain to accommodate the wide variation in the received power of the input signal 301. The gain of the AGC amplifier 334b is preferably controlled by varying the power supplied thereto using a digital to analog converter (DAC) 334c. The operation of the AGC amplifier 334b is discussed in detail in the commonly assigned, co-pending patent application entitled "AN IMPROVED CDMA RECEIVER AND METHOD OF OPERATION," herein incorporated by reference.

The second mixer 335 receives the conditioned first IF signal 333 and a second mixing tone 371 from the second frequency synthesizer 370, downconverting the first IF signal 333 to a second IF signal 336. In the exemplary embodiment, the frequency of the second mixing tone is 206.8 MHz, and the second mixer 335 produces a second IF signal 237 at the (RF-LO) frequency of 2.45 MHz. The second mixer 335 is preferably a Gilbert Cell mixer, although alternative circuit topologies may be implemented.

The demodulator 339 receives the second IF signal 236 and the sampling signal 394. In the exemplary embodiment of FIG. 3, the demodulator 339 includes a filter 339a for attenuating the spurious mixing products generated by the second mixer, an amplifier 339b for increasing the signal strength of the second IF signal, and an analog to digital converter (ADC) 339c for converting the analog CDMA signal to a digital data stream. The filter 339a and amplifier 339b have a center frequency of operation of 2.45 MHz. The operation of the ADC 339c is discussed in greater detail in the aforementioned patent application entitled "AN IMPROVED CDMA RECEIVER AND METHOD OF OPERATION."

The ADC 339c receives the sampling signal 394. In this embodiment, the sampling source 390 consists of the system's clock signal operating at 1.2288 MHz and the sampling circuit 392 consists of a ×8 frequency multiplier to generate the sampling signal 394 having a frequency of 9.8304 MHz.

Ordinarily, the frequency of the sampling signal 394 is set to an integer multiple of the second IF frequency 336 to satisfy the Nyquist criterion, given in equation (1):

$$\text{sampling frequency} = N \times \text{second IF frequency, where } N \geq 2 \qquad (1)$$

However, the sampling source 390 and sampling circuit 392 may not be able to synthesize a sampling frequency 394 which is an integer multiple of the second IF frequency 336. In this case, some error will occur in the demodulation process in the form of the loss in orthogonality between the I and Q data, the degree of loss being proportional to how close the sampling frequency 394 is to a multiple of the second IF frequency 336. If the sampling signal 394 is slightly off from the second IF frequency 336, only a negligible amount of error will occur.

In the exemplary embodiment of FIG. 3, the second IF signal 336 operates at a frequency of 2.45 MHz, whereas the sampling signal 394 operates at a harmonic frequency of (2×1.2288 MHz)=2.4576 MHz. Thus, the closest harmonic of the sampling frequency is offset from the second IF frequency by the amount of (2.45−2.4576) MHz or 7600 Hz. The 7600 Hz offset at the 2.45 MHz second IF signal frequency represents less than one percent of phase degradation between the orthogonal I and Q components of the CDMA signal. This small amount of phase degradation produces a negligible loss in signal quality. Thus, the need for a third frequency synthesizer to demodulate the second IF signal is avoided. Instead, the existing system clock signal and a frequency multiplier are used to convert the analog CDMA signal into a digital CDMA data stream without a significant reduction in signal quality.

The PCS-band Transmitting Channel

The transmitting channel 350 operates in a reciprocal manner from the receiving channel 330, converting baseband I and Q data to a transmitted signal 302 operating at a frequency between 1851.25 MHz–1908.75 MHZ. The transmitting channel 350 includes a third mixer 352, an IF circuit 354, a fourth mixer 355, and a RF circuit 357.

The third mixer 352 receives a modulated signal 351 containing the orthogonal I and Q data components. In the preferred embodiment, the modulated signal operates at a frequency of 103.4 MHz. A ⅛ frequency divider xx converts the second mixing tone from 206.8 MHZ to 25.95 MHz, which is supplied to the third mixer 352. The third mixer 353 upconverts the modulated signal 351 to an IF signal 353 at the (LO+RF) frequency of 129.25 MHz. The third mixer is preferably a Gilber cell mixer, although alternative circuit topologies may be implemented.

The IF circuit 354 receives the IF signal 353 and in the exemplary embodiment of FIG. 3, includes an IF filter 354a and an IF AGC amplifier 354b. The IF filter 354a is used to attenuate spurious mixing products generated by the operation of the third mixer 352. The AGC amplifier 354b provides variable signal gain to the IF signal 353 to compensate for variations in the transmitted power, as discussed below. The gain of the IF AGC amplifier 354b is preferably controlled by varying the power supplied thereto using a digital to analog converter (DAC) 354c.

The fourth mixer 355 receives the amplified IF signal 353 and the first mixing tone 361 from the first frequency synthesizer 360, and upconverts the amplified IF signal 353 to a RF signal 356. In the exemplary embodiment, the first frequency synthesizer 360 is tunable every [1.23?] MHz between 1722.0 MHz–1779.5 MHz. During transmission, the frequency of the first mixing tone 361 is controllably selected so that the fourth mixer 355 produces a RF signal 356 at the (RF+LO) frequency in the transmission frequency range of 1851.25 MHz–1908.75 MHZ. The fourth mixer 355 is preferably a Gilbert Cell Mixer, although alternative circuit topologies may be implemented.

The RF circuit 357 receives the RF signal 356 and in the exemplary embodiment of FIG. 3, includes a medium gain, high output power amplifier 357a and a coupler 357b. The power amplifier provides the RF signal 356 with sufficient output power to transmit it to its intended destination. The gain and output power of the power amplifier 357b is preferably controlled by varying the power supplied thereto using a digital to analog converter (DAC) 357c.

The coupler 357b samples the level of the amplified RF signal 356 and a ADC 357d converts the sampled level to digital data. The sampled level data is fed back to a central controller (not shown) which adjusts the gain of the power amplifier 357a and/or the AGC amplifier 354b by sending control signals to the DACs 357c and/or 354c. The control signals are converted into analog power settings by the DACs 357c and/or 354c, thereby varying the gain and output power produced by each. In this manner the transmitting channel gain and output power can be monitored and controlled.

II. Dual mode Cellular-band Transceiver

Figure 4:
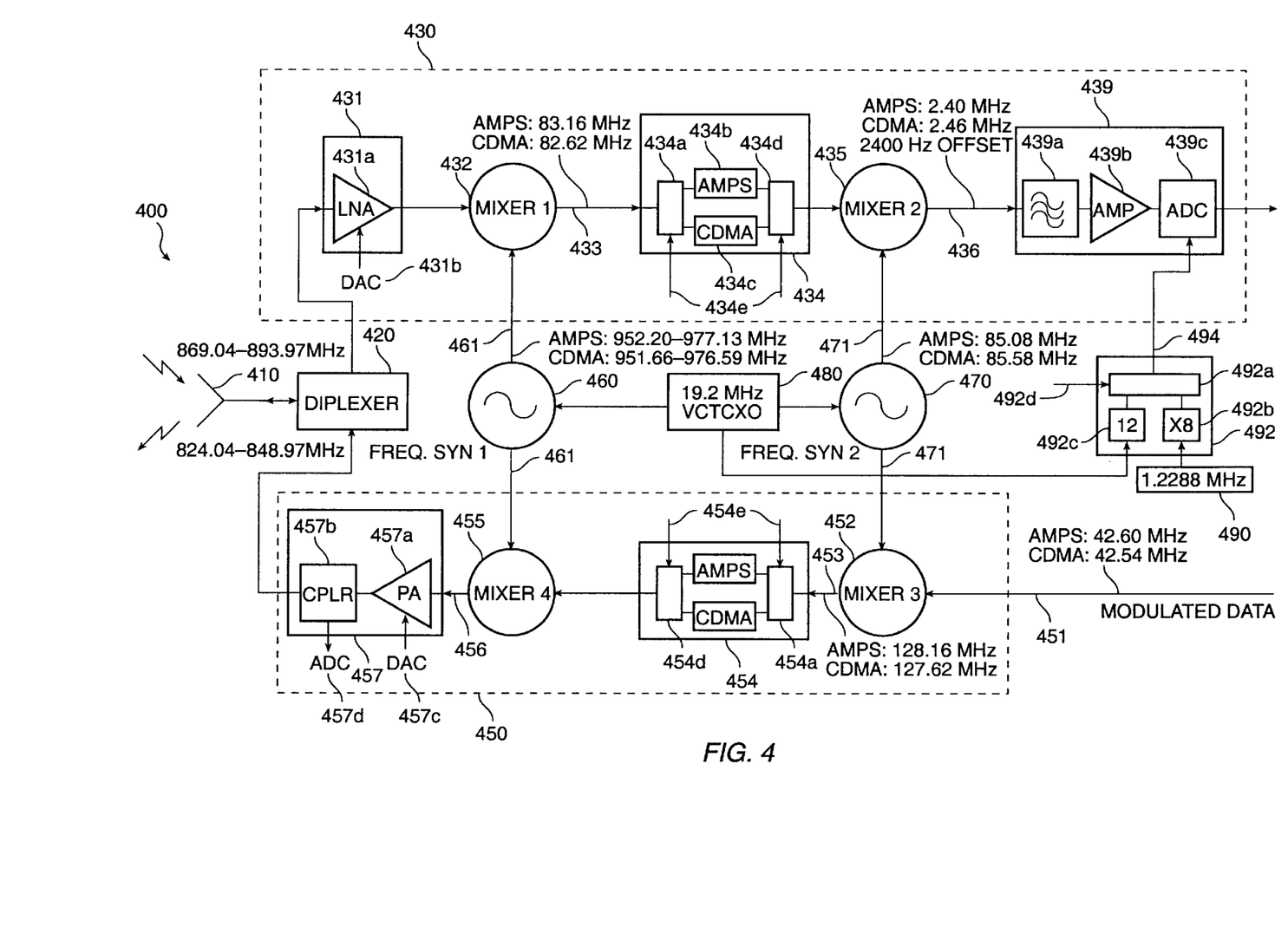
FIG. 4 illustrates a cell-band dual-mode wireless transceiver in accordance with the invention.

FIG. 4 illustrates a cell-band transceiver in accordance with the present invention. The transceiver 400 includes a transceiver antenna 410, a diplexer 420, a receiving channel 430, a transmitting channel 450, a first frequency synthesizer 460, a second frequency synthesizer 470, a sampling source 480, and a reference source 490.

The transceiving antenna 410 is optimized for transmission and reception of signals within the cell frequency band, 869.04–893.97 MHZ for receiving signals 401, and 824.04–848.97 MHz for transmission signals 402. The diplexer 420 is similarly designed to operate at the transmit and receive frequencies.

The Cell-band Receiving Channel

The receiving channel 430 of the cell-band transceiver is designed to receive and downconvert CDMA and AMPS signal and includes an RF circuit 431, a first mixer 432, an IF circuit 434, a second mixer 435, and a demodulator 439. In the exemplary embodiment of FIG. 4, the RF circuit includes a low noise amplifier (LNA) 431a used to set the input noise figure. The gain and noise figure (NF) of the LNA 431a is preferably controlled by varying the power supplied thereto using a digital to analog converter (DAC) 431b.

The first mixer 432 receives the amplified RF signal and a first mixing tone 461 from the first frequency synthesizer 460, and downconverts the amplified RF signal to a first IF signal 433. In the exemplary embodiment of FIG. 4, the first frequency synthesizer 460 is tunable and can generate a mixing tone 361 every 30 KHz between 951.66 MHz–976.59 MHz for CDMA received signals or 952.20 MHz–977.13 MHz for AMPS received signals. The frequency of the first mixing tone 461 is controllably selected to be:

LO=(RF+IF), where IF=83.16 MHZ for AMPS signals IF=82.62 MHZ for CDMA signals     (2)

The first mixer 432 is preferably an Gilber cell mixer. Other mixer circuits may be alternatively used if designed to operate at the aforementioned frequencies.

The IF circuit 434 receives the first IF signal 433 and in the exemplary embodiment of FIG. 4, includes an a first switch 434a, an AMPS IF filter 434b, a CDMA IF filter 434c, and a second switch 434d. The AMPS and the CDMA IF filters 434b and 434c are used to attenuate spurious mixing products generated by the operation of the first mixer 432. The AMPS IF filter is tuned to 83.16 MHz and the CDMA IF filter 434c is tuned to 82.62 MHz. The first and second switches 434a and 434d connect one of the IF filters between the input and output terminals responsive to control signals 434e.

The second mixer 435 receives the filtered first IF signal 433 and a second mixing tone 171 from the second frequency synthesizer 470, downconverting the first IF signal 433 to a second IF signal 436. In the exemplary embodiment, the frequency of the second mixing tone 471 is 85.58 MHz for a received CDMA signal or 85.08 MHz for a AMPS signal. The second mixer 337 produces a second IF signal 436 at the (LO-RF) frequency of 2.40 MHz for an AMPS signal or 2.46 MHz for a CDMA signal.

The demodulator 439 receives the second IF signal 436 and the sampling signal 494. The demodulator 439 includes a filter 439a for attenuating the spurious mixing products generated by the second mixer, an amplifier 439b for increasing the signal strength of the second IF signal, and an analog to digital converter (ADC) 439c for converting the analog AMPS or CDMA signals to a digital data stream. In the exemplary embodiment of FIG. 4, the sampling circuit 492 includes a switch 492a, frequency multiplier 492b, and a frequency divider 492c. The sampling source 490 consists of the VCTCXO 480 which operates at 19.2 MHz and the system data clock 495 which operates at 1.2288 MHz in the preferred embodiments.

The switch 492a is controlled via a control signal 492d such that when an AMPS received signal is detected, the switch 492a connects the 19.2 MHz VCTCXO as the sampling source. The frequency divider 492c generates a sampling frequency of 9.6 MHz which is supplied to the ADC 439c, sampling the second IF signal at 2.40 MHz exactly 4 times, satisfying the Nyquist criterion without the introduction of any signal distortion.

When the received signal is detected as a CDMA signal, the control signal 492d controls the switch 492a to connect in the 1.2288 MHz system data clock 495. A sampling signal can be generated at the second harmonic of the system clock at 2.4576 MHz (2×1.2288 MHz), which is 2400 Hz offset from the second IF frequency (2.46 MHz). The 2400 MHz offset at 2.46 MHz will result in less than 0.3 percent phase degradation in the orthogonality between the I and Q signal components upon demodulation, producing negligible signal degradation. A ×8 frequency multiplier 492b is used to increase the system data clock frequency from 1.2288 MHz to 9.8304 MHz, and the 9.8304 MHz signal is used as the sampling signal 483. In this manner, the ADC 439c makes use of existing clock signals for its sampling source and the need for a third frequency synthesizer to demodulate the separate AMPS and CDMA signal within the cell frequency band is avoided.

The Cell-band Transmitting Channel

The transmitting channel 450 operates in a reciprocal manner from the receiving channel 430, converting baseband I and Q data to a transmitted signal 402 operating within the cell transmit frequency band of 824.04 MHz–848.97 MHz. The transmitting channel 450 includes a modulator 452, a third mixer 454, an IF circuit 456, a fourth mixer 457, and a RF circuit 457.

The third mixer 452 receives a modulated signal 451 containing the orthogonal I and Q data components. In the preferred embodiment, the modulated signal operates at a frequency of 42.6 MHz for AMPS signal transmission and 42.54 for CDMA signal transmission. The third mixer 452 also receives the second mixing tone 471 from the second frequency synthesizer 470, upconverting the modulated signal 451 to an IF signal 453. The second mixing tone is 85.56 MHz for AMPS signal transmission and 85.08 MHz for CDMA signal transmission The third mixer 452 produces the IF signal 452 at the (LO+RF) frequency of 128.16 MHz for AMPS signal transmission or 127.62 MHz for CDMA signal transmission.

The IF circuit 454 receives and filters the IF signal 433 using an AMPS IF filter or a CDMA IF filter as described above. The AMPS IF filter 454b is tuned to 128.16 MHz and the CDMA IF filter 454c is tuned to 127.62 MHz. The switches 454a and 454d connect one of the IF filters between the input and output terminals responsive to control signals 454e.

The fourth mixer 455 receives the filter IF signal 453 and the first mixing tone 461 from the first frequency synthesizer 460, and upconverts the amplified IF signal 453 to a RF signal 456. In the exemplary embodiment, the first frequency synthesizer generates mixing tones every 30 KHz from 951.66 MHz–976.59 MHz for CDMA transmission signals and from 952.20 MHz–977.13 MHz for AMPS transmission signals, as described above. The fourth mixer 455 produces a RF signal 456 at the (LO-RF) frequency, ranging from 824.04 MHz to 848.97 MHz.

The RF circuit 457 receives the RF signal 456 and includes a power amplifier 457a and a coupler 457b, the operation of which is described above. The power amplifier 457a and coupler 457b are designed to operate over the cell transmit frequency band to accurately control the power of the transmitted signal 402.

While the above is a complete description of the preferred embodiments of the invention, various alternatives modifications and equivalence may be used. For example, any of the disclosed circuitry may be realized in integrated circuit or lumped element form depending upon the desired frequency of operation. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A wireless transceiver capable of transmitting CDMA signals to and receiving CDMA signals from a remote location, the wireless transceiver comprising:

a first frequency synthesizer for providing a first mixing tone;

a second frequency synthesizer for providing a second mixing tone;

a first sampling source for providing a first source frequency;

a sampling circuit coupled to said first sampling source for providing a sampling signal; and a receiving channel coupled to said first frequency synthesizer, to said second frequency synthesizer, and to said sampling source, said receiving channel comprising:
- a first mixer configured to received said first mixing tone and a received signal, said first mixer producing a first IF signal in response;
- a second mixer configured to receive said first IF signal and said second mixing tone, said second mixer producing a second IF signal in response; and
- an analog to digital converter configured to receive said second IF signal and said sampling signal and for generating a digital data stream in response, wherein if said received signal is a CDMA signal, the frequency of said sampling signal is offset from the frequency of said second IF signal.

2. The wireless transceiver of claim 1 further comprising:

a data source for providing modulated data;

a transmitting channel coupled to said data source, to said first frequency synthesizer, and to said second frequency synthesizer, said transmitting channel comprising:
- a ⅛ frequency divider configured to receive said second mixing tone and to produce a one-eighth second mixing tone;
- a third mixer configured to received said modulated data and said one-eighth second mixing tone, said third mixer producing an IF signal in response; and
- a fourth mixer configured to receive said IF signal and said first mixing tone, said second mixer producing signals at the frequency of said transmitted signals in response.

3. The wireless transceiver of claim 2, wherein said received signals are CDMA signals operating between 1931.25 MHz–1988.75 MHz, said transmitted signals are CDMA signals operating between 1851.25 MHz–1908.75 MHZ, said first mixing tone operating between 1722.0 MHZ–1779.5 MHz, said second mixing tone operates at 206.8 MHz, and said sampling signal operates at a multiple of 1.2288 MHz.

4. The wireless transceiver of claim 3, wherein said first and second frequency synthesizers are coupled to a common reference generator operating at 19.2 MHz.

5. The wireless transceiver of claim 3, wherein said receiving channel further comprises:
- an antenna for transmitting and receiving said CDMA signals; and
- a diplexer having a first terminal coupled to said antenna, a second terminal coupled to said receiving channel for passing said received CDMA signals from said antenna to said receiving channel, and a third terminal coupled to said transmitting channel for passing said transmitted signals from said transmitting channel to said antenna.

6. The wireless transceiver of claim 5, wherein said receiving channel further comprises:
- a RF circuit having an input coupled to said second terminal of said diplexer and an output coupled to said first mixer, said RF circuit providing amplification and filtering to said received signal; and
- an IF circuit having an input coupled to said first mixer and an output coupled to said second mixer, said IF circuit providing amplification and filtering to said first IF signal.

7. The wireless transceiver of claim 1, further comprising a second sampling source coupled to said sampling circuit for providing a second source frequency.

8. The wireless transceiver of claim 7, wherein said received signals comprise CDMA and AMPS signals operating between 869 MHz and 894 MHz, said first sampling source operating at 1.2288 MHz and said second sampling source operating at 19.2 MHz.

9. The wireless transceiver of claim 8, wherein, if said received signal is a CDMA signal, said sampling circuit generates a sampling signal at an integer multiple of 1.2288 MHz and said sampling signal is not an integer multiple of said second IF frequency.

10. The wireless transceiver of claim 9, wherein, if said received signal is an AMPS signal, said sampling circuit generates a sampling signal at an integer multiple or divisor of 19.2 MHz and said sampling signal is an integer multiple of said second IF frequency.

11. The wireless transceiver of claim 10, wherein if said received signal is a CDMA signal, said first mixing tone operates between 952 MHz and 978 MHz, and said second mixing tone operates at 85.08 MHz.

12. The wireless transceiver of claim 11, wherein if said received signal is a AMPS signal, said first mixing tone operates between 951 MHz and 977 MHz, and said second mixing tone operates at 85.58 MHz.

13. The wireless transceiver of claim 12, further comprising:
- an antenna for transmitting and receiving said CDMA and AMPS signals; and
- a diplexer having a first terminal coupled to said antenna, a second terminal coupled to said receiving channel for passing said received signals from said antenna to said receiving channel, and a third terminal coupled to said transmitting channel for passing said transmitted signals from said transmitting channel to said antenna.

14. The wireless transceiver of claim 13, wherein said receiving channel further comprises:
- a RF circuit having an input coupled to said second terminal of said diplexer and an output coupled to said first mixer, said RF circuit providing amplification and filtering to said received AMPS and CDMA signal; and
- an IF circuit having an input coupled to said first mixer and an output coupled to said second mixer, said IF circuit providing amplification and filtering to said first IF signal.

15. In a wireless transceiver capable of receiving CDMA signal from a remote location, a method for converting an incoming signal to a digital data stream comprising the steps of:

receiving an incoming signal;

synthesizing a first mixing tone;

synthesizing a second mixing tone;

generating a first sampling signal from a first sampling source; and demodulating said incoming signal into said digital data stream, comprising the steps of:
- frequency mixing said incoming signal with said first mixing tone, and in response, producing a first IF signal;
- frequency mixing said first IF signal with said second mixing tone, and in response, producing a second IF signal; and
- applying said first sampling signal and said second IF signal to an analog to digital converter, and in response producing said digital data stream, wherein if said incoming signal is a CDMA signal, the frequency of said first sampling signal is offset from the frequency of said second IF signal.

16. The method of claim 15, wherein said wireless transceiver is further capable of receiving AMPS signals for a remote location, the method of converting said received signal further comprising the step of providing a second sampling source, wherein if said received signal is said AMPS signal, said step of applying comprises the step of applying said second sampling signal and said second IF signal to said analog to digital converter, the frequency of said second sampling signal being a harmonic of the frequency of said second IF signal.

17. The method of claim 15, wherein said step of receiving an incoming signal comprises the step of receiving a CDMA encoded signal in the frequency range of 1931.25 MHz–1988.75 MHz, said step of synthesizing a first mixing tone comprises synthesizing a signal in the frequency range of 1722.0 MHz–1779.5 MHz, said step of synthesizing a second mixing tone comprises the step of synthesizing a signal at the frequency of 206.8 MHz, and said step of generating comprises the step of generating a signal at 9.8304 MHz from an existing signal at 1.2288 MHz.

18. The method of claim 16, wherein said step of receiving an incoming signal comprises the step of receiving a an AMPS-encoded signal within the frequency range of 869 MHz to 894 MHz, said step of synthesizing a first mixing tone comprises synthesizing a signal within the frequency range of 952 MHz to 977 MHz, said step of synthesizing a second mixing tone comprises the step of synthesizing a signal with a frequency of 85.58 MHz, and said step of generating comprises the step of generating a signal at 9.8 MHz from an existing signal at 19.2 MHz.

* * * * *